Jan. 1, 1952      A. R. HOFFMANN ET AL      2,580,782

THERMOCOUPLE HOT WIRE ANEMOMETER

Filed Nov. 7, 1946

ANTON R. HOFFMANN
WALTER J. CRUMP
          INVENTORS

BY    *Charles L. Shelton*

ATTORNEY

Patented Jan. 1, 1952

2,580,782

UNITED STATES PATENT OFFICE 2,580,782

THERMOCOUPLE HOT WIRE ANEMOMETER

Anton R. Hoffmann, Southport, and Walter J. Crump, Stratford, Conn., assignors to United Aircraft Corporation, East Hartford, Conn., a corporation of Delaware Application November 7, 1946, Serial No. 708,378

4 Claims. (Cl. 73—204)

This invention relates to fluid speed indicators.

An object of this invention is to provide an anemometer of the heated-thermocouple type which automatically provides a linear relationship between the temperature differential of the hot and cold junctions of the thermocouple and the velocity of the air stream.

Another object of this invention is to provide an instrument having a heating element for measuring fluid velocity in which current flowing through the heating element is varied as a function of the temperature of the heating element.

It is a further object of this invention to provide a fully automatic anemometer of the heated-thermocouple type which gives a direct velocity reading of the air flow.

Another object of this invention is to provide automatic means to vary the current in a thermocouple heating element so that the generated E. M. F. of the thermocouple will be substantially a linear function of the velocity of a fluid stream flowing across the heating element.

Another object is to provide an anemometer of the heated-thermocouple type which has a greatly increased range of sensitivity as compared with conventional anemometers.

Another object is to provide an anemometer which is accurate at low as well as high velocities.

Another object is to provide electronic controls for an anemometer of the heated-thermocouple type.

Other objects and advantages will be apparent from the specifications and claims and from the accompanying drawing which illustrates what is now considered to be the preferred embodiment of the invention.

Figure 1:
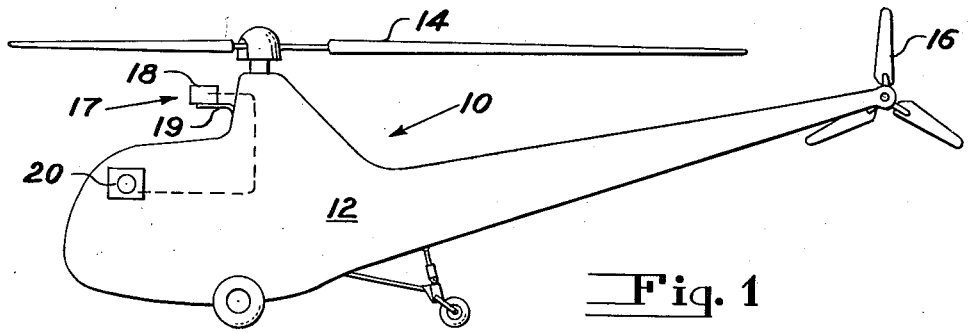
Fig. 1 shows an anemometer according to this invention installed in a helicopter.

Referring to the drawings, Figure 1 shows a helicopter 10 having a fuselage 12 with a sustaining rotor 14 and a torque compensating rotor 16 mounted thereon. The helicopter is provided with an anemometer, constructed according to the present invention and which comprises a pick-up section 17 and an indicating section 20.

Pick-up section 17 comprises a tube or annulus 18 containing a heating element and one or more thermocouples. Tube 18 is supported from fuselage 12 by bracket 19 and has its axis aligned with the direction of forward flight so that air flows through the tube and across the heating element at a velocity indicative of the forward velocity of the helicopter relative to the ambient air.

The indicating section 20 comprises an electronic circuit for controlling the supply of current to the heating element in the pick-up section 17 and an air speed indicator which is connected through wiring, to be described hereinafter, to a thermocouple which is heated by the heating element. The indicating section is mounted conveniently within the fuselage 12. While the anemometer is shown mounted on a helicopter, it may readily be used in other types of aircraft.

Figures 2, 3:
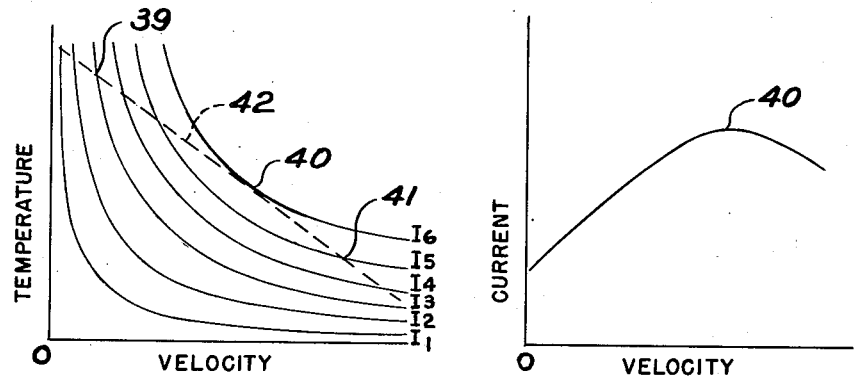
Fig. 2 is a series of curves necessary to the understandinging of the theory and operation of the improved anemometer.
Figure 3 is a curve showing the desired operating characteristics.

Figure 2 shows the family of curves, $I_1$, $I_2$, ... $I_6$ characteristic of the temperature variations of an electrical resistance having a constant current input, with variations in the velocity of a fluidstream flowing over the resistance. Temperature, as used here, refers to the temperature of the resistance relative to the temperature of the fluidstream and is conveniently measured by a thermocouple having a hot junction imbedded in the resistance and a cold junction exposed to the temperature of the fluidstream. Referring to the curve $I_1$, it will be noted that at low air velocities the temperature of a resistance heated thermocouple, having a constant curent input $I_1$, drops rapidly with a small increase in velocity. But in the upper ranges of velocity, the temperature drop is small for a relatively large increase in velocity. Consequently, if a heating element having a constant current input is positioned in a fluidstream its temperature will not be a satisfactory indication of velocity over a wide range.

According to this invention the current input to a heating element in a fluidstream is varied in a novel manner so as to facilitate the measurement of the velocity of the fluidstream and so as to increase the sensitivity of such measurement over a wide range of fluid velocities. This is preferably done by controlling the current flow through the heating element so that the temperature of the element is continuously varied in accordance with changes in velocity as a linear function thereof, as shown by the dashed line 42 in Figure 2. In the preferred embodiment of the invention this is accomplished by utilizing a grid controlled electronic tube, such as a triode, to vary the current flow through the heating element in predetermined relationship to the temperature thereof.

Referring to the dashed line in Figure 2 it will be noted that the current is increased with increasing velocity up to a maximum at the point 40 where the line contacts the constant current line $I_6$. As the velocity is increased further the current will decrease. This relationship between the current and the velocity has been plotted in Figure 3. The grid-voltage plate-current curve of the electronic tube must, therefore, match the current-velocity curve of Figure 3 to give the straight line temperature-velocity curve 42 of Figure 2. Since the characteristic curve of a triode in its saturation range is substantially the same as this current-velocity curve, it is obvious that a tube can be selected or designed which, when operated in its saturation range, will give the desired results. Therefore, by proper tube design and selection of circuit constants and operating voltages, the current flow through the heated element is controlled so that temperature may be regulated as a linear function of the air velocity, giving the temperature-velocity curve having a negative slope shown by the dashed line 42 (Figure 2).

Figure 4:
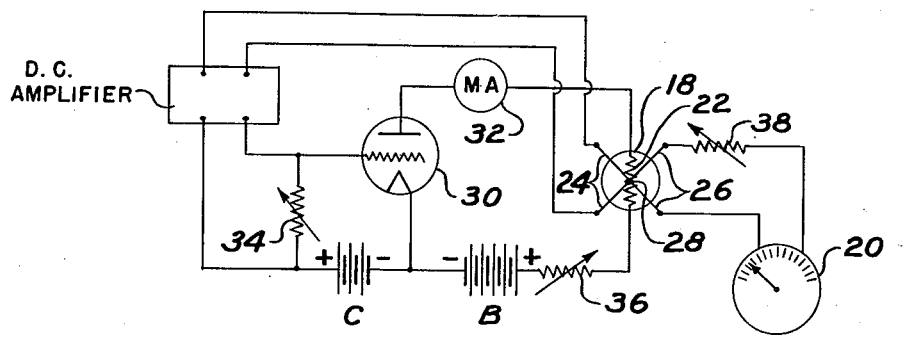
Figure 4 is a wiring diagram for an anemometer according to this invention.

Figure 4 shows the heating element, or resistance, 22 mounted within the tube 18 with thermocouples 24 and 26 having their hot junctions embedded therein. The resistance is supplied with current by a circuit comprising a battery B, the triode 30, and the milliammeter 32. The flow of current in this first circuit is controlled by a second circuit including thermocouple 24, a D. C. amplifier, a battery C, and the grid of the triode 30. Battery C maintains a positive bias on the triode grid. The output from the thermocouple amplifier is also connected to the grid but with a polarity which provides a backing voltage opposing the positive battery bias. A decrease in the amplified thermocouple voltage produces an increase in the positive grid bias voltage. An airspeed or velocity indicator 20 is contained in a separate circuit actuated by the thermocouple 26. Variable resistances 34, 36 and 38 may be provided to permit the component circuits of the anemometer to be finally adjusted.

When the given voltage is impressed across the resistance 22, the temperature thereof will remain constant assuming the velocity remains constant. When the velocity increases from a point 39 to the point 40 (Figure 2), the temperature of the resistance 22 will decrease. This will cause a corresponding temperature gradient decrease between the hot junction 28 and the cold junction of the thermocouple 24, which increases the positive voltage on the grid of the triode 30. This change in grid bias will increase the current flow through the resistance 22 to a value determined by the voltage on the grid. A further increase in velocity to the point 41 will cause a corresponding temperature decrease of the thermocouple 24 which will increase further the positive voltage of the grid. This increase of the bias on the grid, however, will now decrease the current flow through the resistance 22 since the triode has passed through the saturation point and the grid is now attracting electrons which would ordinarily go to the plate. This decrease in current flow will become balanced with the grid bias at the point 41. It is therefore evident that the temperature of the thermocouple 24 determines the grid bias which in turn determines the current flow through the triode and the resistance 22.

Having obtained a straight line relationship between the temperature and velocity, the velocity may be determined by measuring the temperature by means of thermocouple 26 and indicator 20. This indicator may be a voltmeter or an ammeter having a dial suitably graduated in velocity units. Since the temperature voltage relation is linear for a thermocouple, the gradations on the dial will be linear. If desired, the thermocouple 26 may be eliminated and the indicator 20 placed in the circuit with thermocouple 24.

While we have shown a preferred embodiment of our invention, it will be understood that modified structures and different arrangements of parts could be made to accomplish substantially the same function as performed by our device. Therefore we wish not to be limited in our invention only to that form shown and described but by the scope of the following claims.

We claim:

1. In an airspeed indicator for a helicopter, a tube for confining a portion of the free airstream flowing over said helicopter, an electrical resistance element positioned in the airstream in said tube, means for supplying current to said heating element, a thermocouple responsive to temperature changes in said heating element, and means for controlling the current supplied to said heating element so that the generated E. M. F. of the thermocouple is substantially a linear function of the velocity of the airstream flow across said heating element, including an electronic device controlled by the output of said thermocouple and having an electrical characteristic curve substantially inverse to that of the uncompensated thermocouple output, and means including a second thermocouple responsive to the temperature of said heating element for indicating the temperature of the latter in terms of air speed.

2. In an air speed indicator for a helicopter, an electrical resistance element adapted to be located in the airstream flowing past said helicopter, means for supplying heating current to said element, a thermocouple responsive to temperature changes in said element, a second means for controlling the heating current supplied to said element including an electronic device controlled by the voltage output of said thermocouple for maintaining a straight line relationship between the temperature of said element and the velocity of said fluid stream, and indicating means for measuring the temperature of said heating element and indicating the speed of said airstream.

3. In a thermocouple air speed indicator for a helicopter, a tube for confining a portion of the free airstream flowing over said helicopter, an electrical resistance element located in said tube, means for supplying heating current to said element, a thermocouple responsive to temperature changes of said element, an air speed indicator responsive to the temperature of said thermocouple giving a non-linear indication of the speed of the helicopter relative to said airstream, and means for controlling the heating current supplied to said element to compensate for the non-linear indications of said air speed indicator including a second thermocouple responsive to temperature changes in said element and a triode tube for controlling the current to said element having characteristics inverse to said non-linear indications of said first mentioned thermocouple, said tube being operated in its saturation range so that the current flow through the heated element is such that its temperature is substantially a linear function of said airstream velocity.

4. In an instrument having a heating element in a fluid stream, means for supplying current to said heating element, a thermocouple responsive to temperature changes in said element, means for controlling the current supplied to said element including an electronic device controlled by said thermocouple for maintaining a straight line relationship between the temperature of said element and the velocity of said fluid stream, and means for measuring the temperature of said heating element.

ANTON R. HOFFMANN.
WALTER J. CRUMP.

REFERENCES CITED

The following references are of record in the file of this patent:

UNITED STATES PATENTS

| Number | Name | Date |
| --- | --- | --- |
| 1,156,660 | Berg | Oct. 12, 1915 |
| 1,222,492 | Thomas | Apr. 10, 1917 |
| 1,476,762 | Meyer et al. | Dec. 11, 1923 |
| 1,691,600 | Brush et al. | Nov. 13, 1928 |
| 1,766,148 | Sawyer | June 24, 1930 |
| 2,314,877 | Hall | Mar. 30, 1943 |
| 2,412,471 | Olson | Dec. 10, 1946 |